May 28, 1963 W. T. HARRIS 3,091,708

CIRCUIT ELEMENT TRANSDUCER

Original Filed March 14, 1956 3 Sheets-Sheet 1

INVENTOR.

WILBUR T. HARRIS

BY

James and Franklin

ATTORNEYS

CIRCUIT ELEMENT TRANSDUCER

Original Filed March 14, 1956 3 Sheets-Sheet 2

INVENTOR.
WILBUR T. HARRIS
BY James and Franklin
ATTORNEYS

CIRCUIT ELEMENT TRANSDUCER

Original Filed March 14, 1956 3 Sheets-Sheet 3

INVENTOR.
WILBUR T. HARRIS
BY
James and Franklin
ATTORNEYS 3,091,708
Patented May 28, 1963

3,091,708

CIRCUIT ELEMENT TRANSDUCER

Wilbur T. Harris, Woodbury, Conn., assignor to The Harris Transducer Corporation, Woodbury, Conn., a corporation of Connecticut Original application Mar. 14, 1956, Ser. No. 571,462, now Patent No. 2,978,597, dated Apr. 4, 1961. Divided and this application Sept. 30, 1960, Ser. No. 59,710
2 Claims. (Cl. 310—8.2)

My invention relates to electro-mechanical circuit transducers of the three-terminal variety, wherein an input and an output circuit may be coupled substantially only by the inherent mechanical properties of the device. This application is a division of my application Serial No. 571,462, filed March 14, 1956, entitled "Circuit Element Transducer," now Patent No. 2,978,597, granted April 4, 1961, which is in turn a continuation-in-part of my application Serial No. 301,554, filed July 29, 1952, now abandoned and having the same title.

It is an object of the invention to provide an improved device of the character indicated.

Another object is to provide an improved piezo-electric transducer having resonant characteristics determined primarily by mechanical means.

Another object is to provide improved band-pass filter construction, wherein the band-pass characteristics are determined by mechanically resonant properties.

It is a general object to meet the above objects with basically simple constructions that are inherently rugged and are characterized by high operating efficiency.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Figures 1, 2, 3, 4, 5, 6, 7, 8, 9, 10, 11, 12, 13, 14:
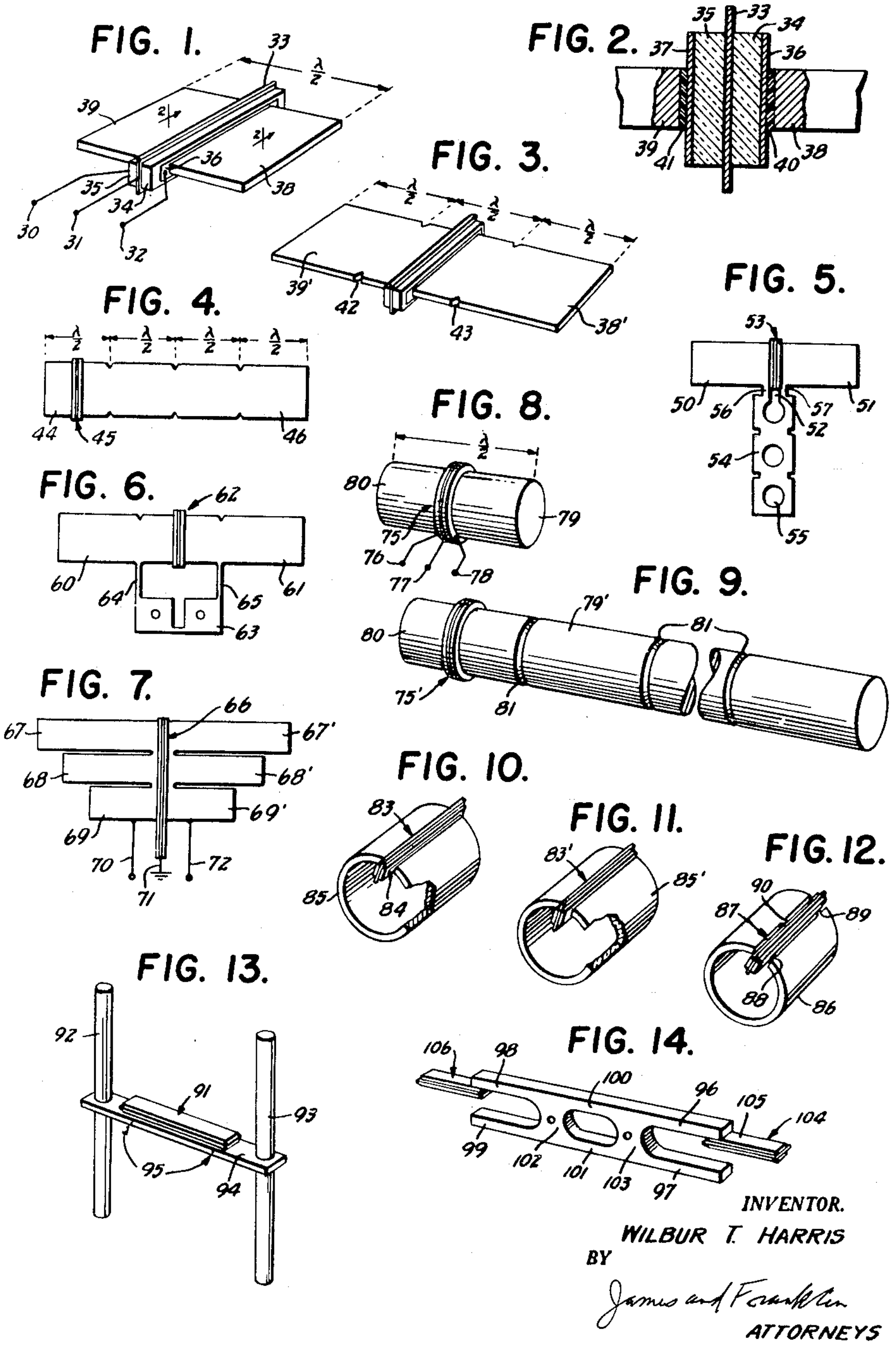
FIG. 1 is a view in perspective illustrating a simplified form of one general embodiment of the invention.
FIG. 2 is an enlarged fragmentary view, in partial section, taken in the plane 2—2 of FIG. 1.
FIGS. 3, 4, 5, 6 and 7 illustrate slight modifications of the general embodiment of FIG. 1.
FIG. 8 is a view in perspective illustrating another general embodiment of the invention.
FIG. 9 is a view in perspective of a slight modification of the arrangement of FIG. 8.
Figure 15:
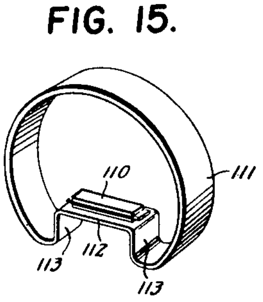
Figure 16:
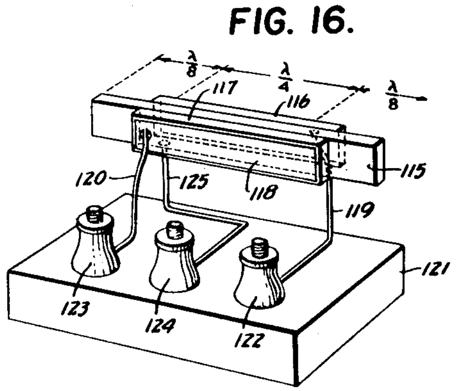
Figure 17:
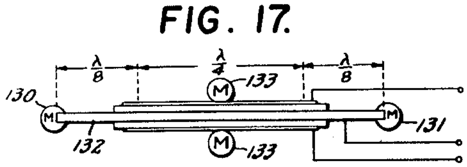
Figure 18:
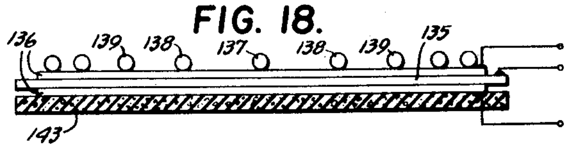
Figure 19:
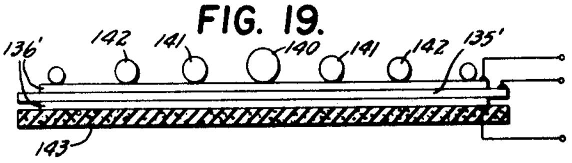
Figure 20:
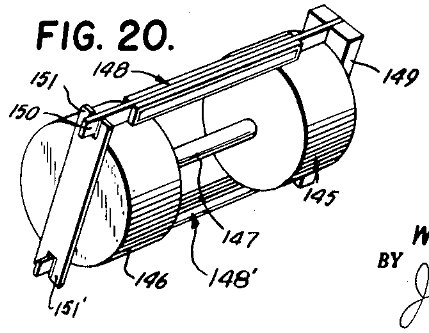
Figures 20A, 21, 22, 23, 24, 25, 26, 27, 28:
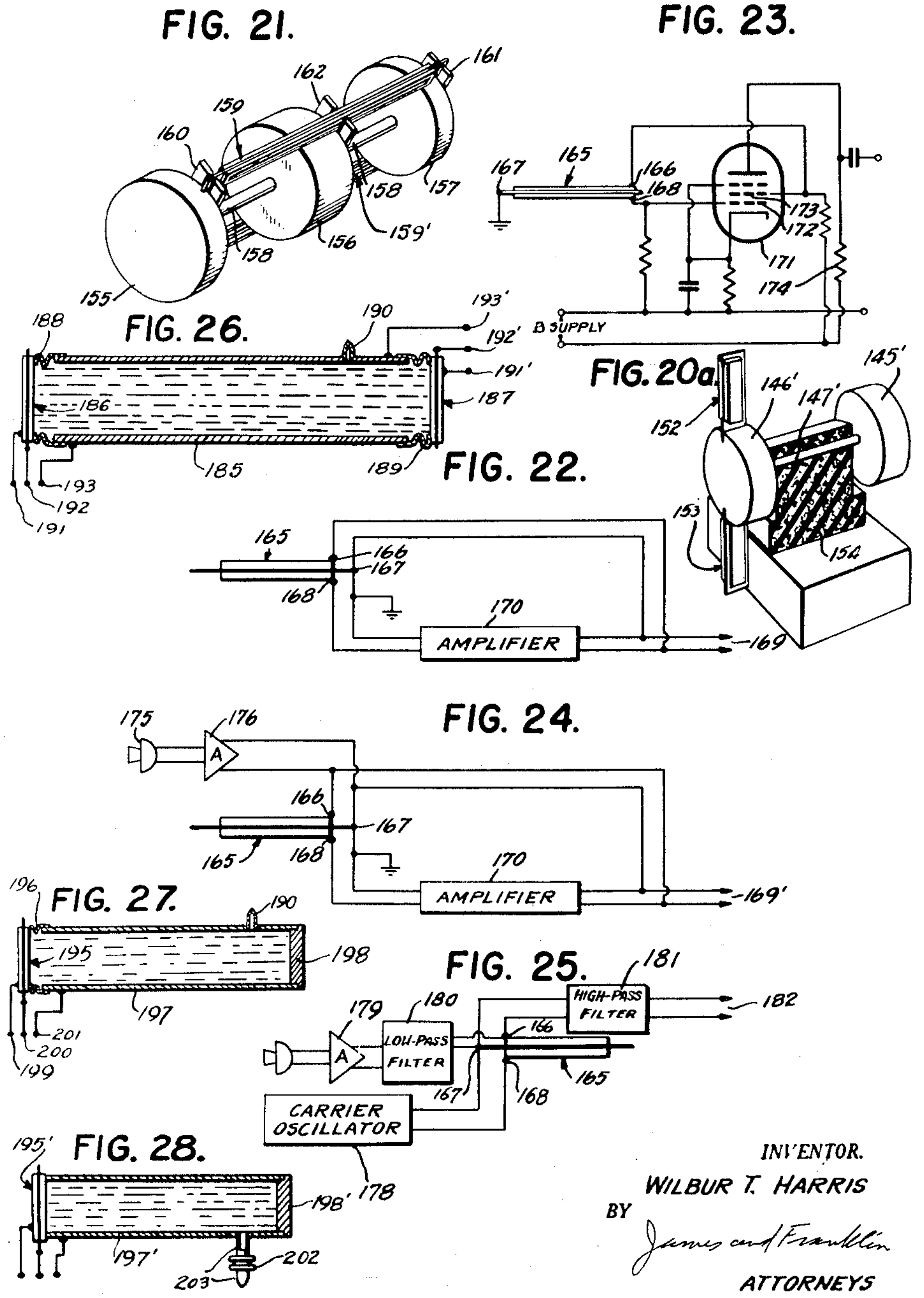

FIGS. 10, 11, and 12 are views in perspective, partially broken away, and illustrating three forms of another general embodiment of the invention;

FIGS. 13 and 14 are perspective views illustrating two forms of a further general embodiment of the invention;

FIGS. 15 and 16 are perspective views illustrating further modifications of the invention;

FIGS. 17, 18 and 19 are views in elevation, illustrating three modifications of the general form illustrated in FIG. 16;

FIGS. 20, 20*a* and 21 are perspective views illustrating still another general form of the invention;

FIGS. 22 to 25, inclusive, separately illustrate generalized circuit connections for the transducers of other figures; and FIGS. 26 to 28, inclusive, are simplified longitudinal sectional views illustrating several forms of another generalized embodiment of the invention.

Briefly stated, my invention contemplates novel employment of a three-terminal piezoelectric sandwich, comprising a center conductive foil or strip, to opposite sides of which piezoelectric means may be intimately bonded; for ruggedness, I prefer to employ an electrostrictive ceramic such as barium titanate, as the piezoelectric means. Conducting means may cover corresponding areas of the outer surfaces of the piezoelectric layers and provide the second and third terminals of the device. The sandwich may be attached to or embodied in mechanically resonant structure in such a way as to involve mechanical stressing of the piezoelectric elements, so that the electrical response may be determined essentially only by the mechanical means.

Two general forms of the invention are shown. In one form, the sandwich is compressionally stressed; at resonance, this involves application of mechanical squeezing forces substantially normal to the plane of symmetry of the sandwich. In the other general form of the invention, the sandwich is stressed by bending it along its length. Bending may be accomplished by forming the center member of the sandwich as the bendable element of a mechanically resonant structure, or by cementing the complete sandwich to such a bendable element; bending follows from exciting one element to the exclusion of the other, or from exciting one element in opposed-stress-phase relation with the other. Alternatively, a mechanically resonant structure may be caused to apply opposed forces at variously spaced points along the length of the sandwich.

Referring to FIGS. 1 and 2 of the drawings, my invention is shown in application to a circuit-element transducer providing electric terminals at 30—31—32. The central terminal 31 may be directly connected to the central ply or foil 33 of a piezoelectric sandwich, including piezoelectric slabs 34—35 intimately bonded to opposite sides of the central ply or foil 33. I prefer that the piezoelectric material of slabs 34—35 shall be an electrostrictive ceramic, such as barium titanate. The sandwich is completed by application of conducting means, such as foils 36—37, to the outer exposed surfaces of the piezoelectric slabs 34—35, and these foils provide the other two electrical connections to terminals 30—32. The ceramic 34—35 may or may not be permanently polarized, because it is a simple matter to provide polarizing voltages in the circuit connections to terminals 30—31—32. Also, the polarizing sense for the respective layers 34—35 will depend upon the use to which the sandwich is to be put.

In the form shown in FIG. 1, the sandwich is to be compressionally stressed with a uniform application of stress throughout the longitudinal length of the device. For this purpose, mechanically resonant structure is provided in the form of two highly elastic plates or bars 38—39, which may be cemented directly to the outer foils 36—37, or which may be insulated therefrom, as by layers 40—41, depending upon the use and method of mounting of the device; it will be understood that with a proper application of cement to bond the plates 38—39 to the foils 36—37, the cement itself may provide the desired insulation at 40—41. The plates 38—39 happen to be of like proportions, and, in any event, I prefer that the effective overall length of the assembly in a sense normal to the central plane of symmetry of the sandwich shall be an odd number of quarter wavelengths on each side of such plane of symmetry. In the form shown in FIG. 1, both plates 38—39 are of quarter-wavelength proportions in this sense, so that the device has an overall length of a half wavelength, as suggested by the legend in the drawing.

If a higher Q or sharpness of resonance is desired, then either or both the plates 38—39 may be made of greater length; but, in any case, such length should be equal to an odd multiple of the quarter wavelength, as measured from the central plane of symmetry of the sandwich. In FIG. 3, I illustrate such a construction, wherein each of plates 38′—39′ is approximately three-quarters of a wavelength long. Resonance at the desired frequency is made more certain by notching or otherwise forming discontinuities, at 42—43 representing nodal points under the desired resonant conditions.

In FIG. 4, I illustrate another similar structure, in which one of the plates 44, cemented to one side of the sandwich 45, comprises effectively only a single quarter-wavelength section; whereas the other plate 46, cemented to the other side of sandwich 45, comprises a quarter-wavelength section integrally joined with three half-wavelength sections.

It will be appreciated that the described structures of FIGS. 1 to 4 may be rugged and that they lend themselves to relatively simple mounting, as by spring-finger support at nodal points. Other mounting methods may be employed, and in FIG. 5 I illustrate a construction in which the entire mechanically resonant structure is made from a single metal stamping. The stamping may include two arms 56—57, formed with the opposed plates 50—51 of the resonator and divided from each other by a slot 52, opposed edges of which embrace opposite sides of the piezoelectric sandwich 53. The plates 50—51 may be integrally joined by notched yoke means 54 on opposite sides of the slot 52; and punched openings, as at 55 in the yoke 54, provide a means for screw-mounting the device. It will be appreciated that the legs 56—57 joining the yoke 54 to the respective plates 50—51 may be of such relatively weakened proportions as not materially to affect the ability of plates 50—51 to dominate the response.

In FIG. 6, I illustrate another one-piece, mechanically resonant structure lending itself to easy screw mounting. In the device of FIG. 6, plates 60—61 determine the mechanical-resonance characteristic, and each of them is shown to be substantially three-quarters of a wavelength long with quarter-wave sections embracing opposite sides of the piezoelectric sandwich 62. Yoke means 63 with mounting holes may include spaced arms 64—65, integrally formed with the plates 60—61 at nodal points. It will be appreciated, that even though the plates 60—61 are not notched at their points of connection to arms 64—65, these points of connection may constitute such discontinuity in members 60—61 as nevertheless to promote resonance at the frequency for which these points of connection are nodes.

In FIG. 7, I illustrate a further form and use of the general embodiment of the invention discussed in connection with FIG. 1. In FIG. 7, the piezoelectric sandwich 66 embraces a plurality of pairs of mechanical resonators having different resonant frequencies, so as to provide a transducer having relatively broad band-pass characteristics. In the form shown, the individual halves of all three mechanical resonators are integrally formed from single stampings. Thus, a first pair of resonators 67—67′ may intimately engage opposite sides of the sandwich 66 and yet be integrally joined (as at the point of connection to sandwich 66) to the next resonator element 68—68′, and these elements in turn may be integrally joined to third resonator elements 69—69′. Since the resonator elements 67—67′, and 69—69′ are all formed from the same uniform stamping but with different lengths, each one of these resonators will determine a different resonant frequency, so as to establish a broadened response band for the sandwich 66. With the resonator elements directly connected (as by silver solder) to the outer foils of sandwich 66, broad-band filter characteristics may be determined by making input connections between terminal 70 and the common or grounded connection 71, and by taking output response between the third terminal 72 and the common connection 71.

In FIGS. 8 and 9, I illustrate another general form of the invention but still embodying the compressional stressing of a three-terminal piezoelectric sandwich. In the configuration of FIG. 8, the sandwich 75 may have the same general composition as that discussed for FIG. 2, but, as shown, the sandwich 35 is of generally circular plan form, providing three terminals 76—77—78 corresponding to the terminals 30—31—32 of FIG. 1. The resonator of FIG. 8 is shown to comprise rod lengths 79—80 of circular section intimately bonded to the outer surfaces of the sandwich 75. As in the simplified arrangement of FIG. 1, the all-over axial length of the FIG. 8 device is substantially a half wavelength.

In FIG. 9, I illustrate a similar arrangement, in which the sandwich 75′ is compressionally excited by a quarter wavelength resonator element 80 on one side, and by a substantially longer resonator element 79′ on the other side. As in the case of FIG. 4, the resonator element 79′ in FIG. 9 may be notched, as by means of circumferential grooves 81 at the nodal points. It will be seen that, when excited, the device of FIG. 9 may offer improved performance over that of FIG. 4, in that, with a circular-section resonator, resonance is more likely to be more limited to the purely longitudinal mode of the resonator bars, whereas in FIG. 4 there is the possibility of establishing an undesired component at the resonant frequency in the bending mode.

In FIGS. 10, 11, and 12, I illustrate application of the principles of the invention to mechanical resonators of circular or cylindrical configuration, and excitable in the radial mode. In FIG. 10, a sandwich 83 may be of the type discussed above in connection with FIG. 2, and including insulating layers as at 84, overlapping both outer foils of the sandwich. The resonator may comprise a circumferentially discontinuous cylinder 85 of metal, having edges at the discontinuity to embrace the insulated sides of the sandwich 83. It will be understood that, when excited in the radial mode, the sandwich will be compressionally stressed, and the frequency of radial-mode resonance may determine the performance of the sandwich 83.

In FIG. 11, I illustrate a slight modification of FIG. 10, wherein the cylinder 85′ is of non-conductive material, such as glass or plastic. Since the material of cylinder 85′ is non-conductive, there is no possibility of cylinder 85′ short-circuiting the opposite outer foils of the sandwich 83′. Therefore, in FIG. 11 no insulating layers need be applied to the outer foils of sandwich 83′.

In FIG. 12, I illustrate another modification of the transducer in FIG. 10, wherein oscillations of a cylinder 86 establish bending-mode stressing of a sandwich 87, which may be a three-terminal sandwich, as discussed above in connection with FIG. 2. For this purpose, one of the discontinuity edges of cylinder 86 may be provided with spaced projections or supports 88—89 engaging one side of the sandwich 87 at correspondingly spaced points. The other edge of cylinder 86 may be formed with another supporting projection 90 engaging the opposite side of sandwich 87 at a point intermediate and preferably half-way between points 88—89. Bending results upon excitation of one element (say, the left-hand element of sandwich 87) to the exclusion of the other (say, the right-hand element of sandwich 87) in which case said other element may be a pick-up or output element; alternatively, both elements of sandwich 87 may be excited in opposed-stress-phase relation (i.e. such that the opposed element slabs expand in length in 180°-phase relation). The frequency of excitation is preferably substantially a particular mechanically resonant frequency of cylinder 86 which is accompanied by a flexing of sandwich 87.

In FIG. 13, I illustrate another general form of the invention, wherein a mechanically resonant structure may determine bending-mode stressing of a three-terminal piezoelectric sandwich 91. The mechanical resonator may comprise two like rods 92—93, held in spaced relation by a strap or yoke 94 of high elasticity. Strap 94 may itself constitute the center ply of the piezoelectric sandwich, that is, with piezoelectric layers applied to opposite sides thereof and with conductive foils on the outer exposed surfaces of the piezoelectric layers. However, in the form shown, a complete piezoelectric sandwich 91, as discussed in connection with FIG. 2, is bonded along one outer surface thereof to the connecting strap 94. The described structure may be simply produced by stamping the yoke 94 and by force-fitting the bars 92—93 in insertion holes at the ends of strap 94. In use, the device may be supported as by spring fingers (not shown) engaging the bar 94 at nodal points, as suggested at 95. Again, bending results from asymmetrical excitation of the sandwich 91, that is, by exciting only one piezoelectric slab element or by exciting both slabs in 180° stress-phase opposition, the excitation frequency being substantially the mechanically resonant frequency of structure 92—93—94.

In the arrangement of FIG. 14, another form of mechanical resonator is caused to stress a three-terminal piezoelectric sandwich in the bending mode. Basically, the device of FIG. 14 comprises two tuning forks with one pair of tynes 96—97 at one end and with another pair of tynes 98—99 at the other end, and joined by common yoke means. The yoke means may comprise spaced arms 100—101, preferably aligned with corresponding opposed tynes 96—98 and 97—99, respectively. The ends of arms 100—101 may be joined by bridges 102—103, spaced from each other preferably effectively one-half a wavelength at the resonant frequency of the device, and, if desired, these bridges may be provided with mounting holes, as shown at the node points. At resonance, the tynes 96—97 will deflect outwardly in phase with outward deflection of the tynes 98—99, and at the same time deflection of the arms 100—101 will be in phase opposition—that is, characterized by inward deflection. A piezoelectric sandwich of the type shown in FIG. 2 may be excited in the bending mode by cementing one side thereof along the outer edge of one of the arms 100—101, but in the form shown I obtain enhanced bending-stress excitatation by mounting a piezoelectric sandwich 104 for cantilevered suspension from one of the tynes 96. Thus, only a limited length of one of the outer surfaces 105 of sandwich 104 need be cemented to a correspondingly limited length of the tyne 96. In operation, the inertia of the unsupported end of the sandwich 104 will cause that unsupported end to resist displacement upon displacement of the tyne 96. The result will be establishment of a pronounced bending-stress condition in the sandwich.

If desired, the mechanical structure of FIG. 14 may be caused to control electrical circuits wholly independent from those controlled by the three-terminal sandwich 104. In this connection, an additional three-terminal sandwich 106 may be cemented to a tyne, as at the tyne 98 at the other end of the structure. The two input circuits of sandwiches 104—106 may be excited in common, as by a common parallel connection of such input circuits; and the two output circuits of these sandwiches may be connected in common or wholly independently of each other, all as dictated by application requirements, it being understood that bending for any particular excited element 104 or 106 is achieved by excitation in the manner explained for FIGS. 12 and 13.

In FIG. 15, I illustrate another form of the invention, wherein a three-terminal piezoelectric sandwich 110 is subjected to bending-stress excitations determined by mechanically resonant properties of a ring 111. For enhancing bending of the sandwich 110, I prefer that it be mounted on a bendable strip 112, integrally formed with the ring 111 as a re-entrant portion and joined thereto by legs 113. The ring 111 may have a plurality of resonant frequencies, all of which may dominate the sandwich 110 in the bending mode.

In FIG. 16, I illustrate another form of my invention characterized by bending-mode stressing of a piezoelectric sandwich. In the form of FIG. 16, the mechanically resonant properties of the device are dominated and determined by a bar or strip 115 of highly elastic steel. The strip 115 may comprise the center ply of the piezoelectric sandwich. Thus, piezoelectric layers 116—117 may be applied to opposite sides of the strip 115. These layers may be coextensive with the strip 115, but I have shown them as extending at least beyond the center quarter wavelength of the construction, so as to include the length in which maximum stress excursions may take place. Conductive foils, as at 118, may be bonded to the outer exposed surfaces of the layers 116—117.

The structure described for FIG. 16 will be seen to lend itself readily to simple mechanical support and electrical connection. For this purpose, connecting wires 119—120 for the outer foils may be mounted on a base 121 and secured to terminals 122—123. The wires 119—120 are preferably stiff and rugged and may be soldered directly to the outer foils of the ceramic sandwich. The point of connection to these foils should in each case be at a node point, as suggested by the dimensions on the drawing, that is, for the form shown, one eighth wavelength in from the respective ends of the sandwich. The central or common connection for terminal 124 may be made through a conductor 125 soldered to the strip 115 at one of the node points mentioned. Excitation will be as described for other bending-mode forms; thus, input signals at the bending frequency of bar 115 may be applied at terminals 123—124, the output being available at terminals 122—124. Alternatively, both slabs 116—117 may be excited in opposed-stress-phase relation so as to create contracting forces along the length of one face of strip 115 when creating expanding forces along the opposite face of strip 115; this may be achieved by oppositely polarizing slabs 116—117 and making in-phase electrical connections thereto, or by polarizing slabs 116—117 alike and making opposed-phase electrical connections thereto.

In FIG. 17, I show how a device of the type illustrated in FIG. 16 may be given a different frequency-response characteristic without requiring any change of dimensions or of mounting. In other words, the same supports may be provided at points one-eighth wavelength in from the ends of the resonator. Frequency response may be lowered by application of matched weights at the center and at the ends of the assembly. I have shown weights 130 and 131 secured to the ends of the strip 132, and similar weights 133 at the center. If the weights 133 (combined) represent twice each of the end weights 130—131, then the mode of motion of the strip 132 will not be changed; so that the nodes will not shift and the same mounting structure may be employed, even though the resonant frequency has been altered.

FIGS. 18 and 19 illustrate how a band-pass filter may be constructed from structure resembling that of FIG. 16. In FIG. 18, I show a piezoelectric sandwich with a central resonance strip 135 and with ceramic piezoelectric layers 136 on opposite sides. The strip 135 is preferably relatively long, so that, if it were to vibrate at resonance, several full standing waves could be established along its length. The tendency to oscillate at this particular frequency may be reduced by application of a loading mass, say the weight 137, at a point of greatest motion for this characteristic frequency. Thus, with the application of weight 137, the frequency may be lowered, or at least transducer 135—136 will be caused to have a different characteristic resonant frequency. By the application of further weights 138—139 and so forth, all of which may have the same mass as the weight 137 (but which are secured at different spacings from each other and preferably symmetrically with respect to the center of the strip 135), it is possible to provide a number of discrete lengths along the strip 135 which will have tendencies to oscillate at different frequencies. The adjacency of these frequencies may be such as to produce for the piezoelectric sandwich an overall response which will be characterized by all of these frequencies and which will, therefore, have a broad band.

In FIG. 19, I illustrate how the same broad-band effect may be achieved by employment of different masses 140—141—142 secured to the resonator 135′—136′ at selected spacings which may be uniform spacings. In the case of both structures in FIGS. 18 and 19, mounting may be simply achieved by cementing the unweighted side of the sandwich to a sponge-rubber or like cushion 143, which may in turn be cemented to a solid base (not shown).

In FIG. 20, I illustrate a simplified form of another class of mechanical resonators to which my three-terminal piezoelectric sandwich may be applied. The resonator of FIG. 20 is essentially a torsional resonator comprising spaced masses 145—146, joined by a torsionally resilient member or rod 147. The masses 145—146 are preferably characterized by equal amounts of inertia. At resonance, a given point on mass 145, off the axis of rod 147, will oscillate angularly with respect to a corresponding point on the mass 146, and I utilize this angular oscillation to derive bending stresses for my three terminal sandwich. Adequate flexure may be obtained by securely mounting one end of the sandwich 148 to one of these angularly moving points, as by rigid clamping means 149 carried by the mass 145. The center ply 150 of the sandwich 148 may be of spring steel and project free of the piezoelectric slabs for freely pivoted engagement at 151 with a point or knife-edge support on the mass 146. In order that oscillation will be purely rotational about the axis of rod 147, I prefer to assure symmetry of sandwich-flexing moments by providing additional structure 148′ of mechanical properties similar to those of sandwich 148 and equally angularly spaced therefrom. Thus, structure 148′ may be another piezoelectric sandwich fixed to support 149 and pivotally related to mass 146, as at 151′. In operation, it will be clear that the electrical performance of the device will be substantially entirely dominated by the mechanically resonant properties of the torsionally flexible structure.

In FIG. 20*a*, basically the same mechanical resonator 145′—146′—147′ is utilized as in FIG. 20, but the piezoelectric sandwiches 152—153 are mounted radially (of the oscillation axis) rather than axially. The sandwiches 152—153 are preferably supported on a single mass 146′ in uniformly angularly spaced relation, as by securing the center strip of each sandwich in a radial slot in mass 146′. The entire assembly may be conveniently supported by enclosing the torsion bar 147′ in a mounting block 154 of air-cell rubber or the like. In operation, the sandwiches will be flexed and therefore stressed in accordance with the mechanical oscillatory excursions of mass 146′, and one or more electrical circuits may be effectively coupled by the mechanical properties of the structure.

In FIG. 21, I show a slight modification of the structure of FIG. 20. The modified device may comprise three spaced masses 155—156—157 joined by torsionally resilient means 158. At resonance, the angular oscillation of the center mass 156 will be in phase opposition to that of masses 155—157, and therefore the moment of inertia of the center mass 156 is preferably double that of each of the end masses 155—157. A three-terminal piezoelectric sandwich 159, preferably matched for symmetry by similar structure 159′, may be flexed along its length in accordance with these angular oscillations of the masses by providing point or knife-edge supports 160—161 at opposite ends for direct engagement with the center ply of the sandwich. The centers of sandwich 159—159′ may be rigidly clamped to the center mass 156, but I have shown knife-edge support 162 at this location also. The center ply of the sandwich 159 is shown extending the full length between the end supports 160—161; but, if desired, separate ceramic sandwich layers may be applied between supports 160 and 162 and between supports 162 and 161. With the latter construction, it will be clear that the mechanical structure could dominate the performance of two wholly independent electric circuits operated from piezoelectric elements that are longitudinally spaced on the same center ply. Since, in the form shown, the sandwich 159 extends substantially the full length of the center ply thereof, only one three-terminal circuit connection is available for sandwich 159, but other independent circuits may be operated from three-terminal connections to sandwich 159′, as will be understood.

In the arrangements of FIGS. 26, 27, and 28, I illustrate another generalized application of the principles of my invention. In these arrangements, the mechanical resonator is, in effect, a fluid organ pipe with the three-terminal transducer sandwich characteristic of my invention applied at one or both ends of the pipe.

In the arrangement of FIG. 26, the organ pipe comprises an elongated tube 185 of metal, which may be that known to the trade as Invar. Three-terminal sandwiches 186—187 may be of the disc variety described in connection with FIGS. 8 and 9, and are supported at spaced locations, as at opposite ends of the pipe 185. I have shown sandwiches 186—187 to be connected to pipe 185 by sylphon-bellows means 188—189. For convenience in filling the device with a fluid, which is preferably a silicone or other suitable incompressible fluid, I have provided a small externally projecting capillary tube 190 sealed to the pipe 185. I prefer that the described device be vacuum-filled with fluid and solder-sealed at the filler tube 190.

In use, an input circuit across terminals 191—192 may be mechanically coupled to an output circuit across terminals 192—193; and other similar circuits may be similarly connected to corresponding terminals 191′—192′—193′, at the other end of the device, or further electrically isolated outputs may be available at 191′—192′ and at 192′—193′. Alternatively, the center terminals 192—192′ may be disregarded, and an input circuit applied across terminals 191—193 for mechanical coupling to an output circuit connected across terminals 191—193′. It will be appreciated that with the above described (or with other electrical connections, depending on the desired use) to the device of FIG. 26, electrical performance may be dominated by the mechanical resonance characteristics of the fluid organ pipe.

In FIG. 27, the fluid organ pipe is modified so as to employ but a single three-terminal sandwich 195 closing one end of the device. Sandwich 195 is connected by bellows means 196 to one end of a tube 197. The other end of tube 197 may be closed permanently by a rigid plug 198. In use, an input circuit connected between terminals 199—200 may be mechanically coupled to an output circuit connected across terminals 200—201, as will be understood.

In FIG. 28, I illustrate a slight modification of the device of FIG. 27, in which the sandwich 195′ is rigidly connected to the tube 197′ at one end, while the other end is plugged by member 198′. In FIG. 28, the desired flexibility is achieved by providing bellows means 202 in the capillary filler tube 203 attached to the side of the organ pipe itself.

In FIGS. 22 to 25, I illustrate several basic electrical connections for one or more of the above-described mechanically dominated circuit-element transducers. In each of these views, the circuit-element transducer is shown schematically in its simplest form and is identified by the reference number 165. However, it will be appreciated that this schematic showing is merely suggestive of the above-discussed structures. In FIG. 22, the three terminals 166—167—168 of transducer 165 are connected in an amplifier circuit, so that the mechanically resonant properties of the transducer may dominate the feedback and thus produce an electrically oscillating output at 169 characterized by a frequency wholly determined by the mechanical resonance. For this purpose, one side of the transducer 165 (viz. terminals 167—168) is connected to the input of amplifier 170, and a feedback connection is made from the amplifier output to the other side of transducer 165 (viz. terminals 166—167). In practice, it is found that relatively little gain need be supplied at amplifier 170 in order to produce sustained oscillations at 169.

In FIG. 23, I show a specific oscillator construction utilizing the principles of the circuit of FIG. 22. A single amplifying stage 171 will suffice, and for this purpose I show a multiple-grid tube having a first or input-control grid 172 directly connected to the transducer terminal 168, and having a second or screen grid 173 providing a feed-back connection to terminal 166 of the transducer. It will be noted that the transducer provides the necessary isolation of direct currents, so that no capacitance need be provided in the feedback circuit. Output may be taken from the plate circuit, and I have shown the output to be available across a load resistance 174.

In FIG. 24, I show a slight modification of FIG. 22, wherein the transducer 165 is utilized as a stabilizing means for an oscillator, including amplifier 170, so as to provide, at output 169', the same mechanically dominated frequency as was available in FIG. 22. However, in FIG. 24, there is additional provision for modulating this frequency, as by means of microphone 175 and amplifying means 176 connected across the feedback circuit to terminals 166—167 of the transducer. The output at 169' will be seen to be an audio-frequency modulation on a characteristic mechanically dominated frequency of the oscillator.

FIG. 25 illustrates another circuit involving modulation of a carrier frequency. The carrier frequency may be stabilized by the circuit-element transducer itself, as in FIG. 24, but I have shown a self-sufficient external oscillator 178 for the purpose. Oscillator 178 may be connected across a permanently or otherwise polarized half of transducer 165 at terminals 167—168, and the modulating intelligence may be applied through amplifier 179 and low-pass filter means 180 to the other half of the transducer at terminals 166—167. The latter half of transducer 165 need not be polarized except insofar as polarization is effected by the modulating signal itself. A high-pass filter 181 in the output may assure only the presence of the modulated carrier at 182. In operation, the carrier-frequency signal (which is preferably substantially at the resonant frequency of the sandwich 165) will excite the sandwich so as to produce corresponding stress alternations in the output half of the sandwich. In the absence of a modulating signal there will be no polarization of the output half and therefore no modulated-carrier output. However, as polarization increases with increasing modulating signal, the carrier will be modulated and output produced at 182 accordingly.

It will be seen that I have described basically simple constructions for achieving a highly reliable control of electrical circuits by extreme reliance on mechanical properties of a transducer. In all of my constructions, there is absolutely no electrical dependence on coupling between input and output circuits of the transducer. Energy transfer between these circuits is available only through mechanical means. Such structures lend themselves to use with oscillators, modulators, and as electrical filters, and special effects may be achieved by permanently or otherwise polarizing one or both of the piezoelectric halves of a particular sandwich.

While I have described the invention in detail for the preferred forms shown, it will be understood that modifications may be made within the scope of the invention as defined in the claims which follow.

I claim:

1. In a transducer, a three-terminal sandwich comprising an intermediate conductive layer, two outer conductive layers spaced by piezoelectric ceramic means on opposite sides of said intermediate layer, and a mechanically resonant structure comprising a bendable element in the form of a substantially closed ring, to one side of which one side of said sandwich is bonded.

2. The transducer of claim 1, in which said mechanically resonant structure comprises a closed ring with a radially re-entrant portion including said bendable element.

References Cited in the file of this patent

UNITED STATES PATENTS

| | | |
|---|---|---|
| 2,222,056 | Williams | Nov. 19, 1940 |
| 2,484,950 | Jaffe | Oct. 18, 1949 |
| 2,524,579 | Taylor | Oct. 3, 1950 |
| 2,539,535 | Espenschied | Jan. 30, 1951 |
| 2,625,035 | Firestone | Jan. 13, 1953 |